United States Patent
Liang (10) Patent No.: US 7,308,555 B2
(45) Date of Patent: *Dec. 11, 2007

(54) PROCESSOR-BASED STRUCTURE AND METHOD FOR LOADING UNALIGNED DATA

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 421 days.

This patent is subject to a terminal disclaimer.

(21) Appl. No.: 10/989,312

(22) Filed: Nov. 17, 2004

(65) Prior Publication Data

US 2005/0138343 A1    Jun. 23, 2005

(30) Foreign Application Priority Data

Dec. 19, 2003   (TW) ............................... 92136300 A (51) Int. Cl.
*G06F 12/04* (2006.01)
(52) U.S. Cl. ...................................... 711/214; 711/154
(58) Field of Classification Search ................ 711/117, 711/154, 201, 214; 710/22; 708/209
See application file for complete search history.

(56) References Cited

U.S. PATENT DOCUMENTS

| | | | | |
|---|---|---|---|---|
| 4,814,976 A * | 3/1989 | Hansen et al. | ............... | 711/201 |
| 5,168,561 A * | 12/1992 | Vo | ............................... | 710/22 |
| 5,295,250 A * | 3/1994 | Komoto et al. | ............. | 708/209 |
| 5,386,531 A * | 1/1995 | Blaner et al. | ................ | 711/201 |
| 5,740,398 A * | 4/1998 | Quattromani et al. | ........ | 711/117 |
| 6,721,866 B2 * | 4/2004 | Roussel et al. | ............. | 711/201 |
| 7,051,168 B2 * | 5/2006 | Gschwind et al. | ........... | 711/154 |
| 2006/0010304 A1* | 1/2006 | Homewood et al. | ......... | 711/201 |

\* cited by examiner

*Primary Examiner*—Matthew Kim
*Assistant Examiner*—Paul Schlie
(74) *Attorney, Agent, or Firm*—Bacon & Thomas, PLLC (57) ABSTRACT

A processor-based automatic alignment device and method for data movement. Data stored in a memory at a first position is partitioned by word boundaries into a first part, a second part and a third part and written to the memory at a second position. The device includes: an internal register, a load combine register, a shifter, a rotator, a store combine register and a mask selector. Data is loaded in and aligned by the device for storing in internal register of a processor. Next, data stored in the internal register is automatically aligned and then written in the memory at an unaligned position.

28 Claims, 10 Drawing Sheets

| | 100h | 101h | 102h | 103h |
|---|---|---|---|---|
| 100h | Z | A | B | C |
| 104h | D | E | F | G |
| 108h | H | I | J | K |
| 10Ch | L | Z | Z | Z |

|   |   |   |   |
|---|---|---|---|
| Z | A | B | C |
| D | E | F | G |
| H | I | J | K |
| L | Z | Z | Z |

```
LW   R16, (100)h          //[R16] = ZABCh
SLL  R16, R16, 8          //Shift Left Logical 8 bits, [R16] = ABC0h
LW   R17, (104)h          //[R17] = DEFGh
SRL  R17, R17, 24         // Shift Right Logical 24 bits, [R17] = 000Dh
OR   R16, R16, R17        // Load ABCD into R16, [R16] = ABCDh
LW   R17, (104)h          //[R17] = DEFGh
SLL  R17, R17, 8          // Shift Left Logical 8 bits, [R17] = EFG0h
LW   R18, (108)h          //[R18] = HIJKh
SRL  R18, R18, 24         // Shift Right Logical 24 bits, [R18] = 000Hh
OR   R17, R17, R18        // Load EFGH into R17, [R17] = EFGHh
LW   R18, (108)h          //[R18] = HIJKh
SLL  R18, R18, 8          // Shift Left Logical 8 bits, [R18] = IJK0h
LW   R19, (10C)h          //[R19] = LZZZh
SRL  R19, R19, 24         // Shift Right Logical 24 bits, [R19] = 000Lh
OR   R18, R18, R19        // Load IJKL into R18, [R18] = IJKLh
```

FIG. 2

LWL R16, (100+1)h   //[R16] = ABCXh, X is don't care
LWR R16, (100+4)h   //[R16] = ABCDh
LWL R17, (104+1)h   //[R17] = EFGXh
LWR R17, (104+4)h   //[R16] = EFGHh
LWL R18, (108+1)h   //[R16] = IJKXh
LWR R18, (108+4)h   //[R16] = IJKLh

LDCR [ a | b | c | d ]   100h [ A | B | C | D ]

|  | Big Endian | | | | Little Endian | | |
| --- | --- | --- | --- | --- | --- | --- | --- |
|  | Mode (Big) | rD | Next LDCR | Load Word? | Mode (Little) | rD | Next LDCR | Load Word? |
| LCB | s=0 | (Not Set) | ABCD | YES | s=0 | (Not Set) | ABCD | YES |
|  | s=1 | (Not Set) | ABCD | YES | s=1 | (Not Set) | ABCD | YES |
|  | s=2 | (Not Set) | ABCD | YES | s=2 | (Not Set) | ABCD | YES |
|  | s=3 | (Not Set) | ABCD | YES | s=3 | (Not Set) | ABCD | YES |
| LCW | s=0 | abcd | ABCD | YES | s=0 | dABC | ABCD | YES |
|  | s=1 | bcdA | ABCD | YES | s=1 | cdAB | ABCD | YES |
|  | s=2 | cdAB | ABCD | YES | s=2 | bcdA | ABCD | YES |
|  | s=3 | dABC | ABCD | YES | s=3 | abcd | ABCD | YES |
| LCE | s=0 | abcd | (Not Set) | NO | s=0 | dABC | ABCD | YES |
|  | s=1 | bcdA | ABCD | YES | s=1 | cdAB | ABCD | YES |
|  | s=2 | cdAB | ABCD | YES | s=2 | bcdA | ABCD | YES |
|  | s=3 | dABC | ABCD | YES | s=3 | abcd | (Not Set) | NO |

PROCESSOR-BASED STRUCTURE AND METHOD FOR LOADING UNALIGNED DATA

BACKGROUND OF THE INVENTION

1. Field of the Invention

The present invention relates to the technical field of data processing and, more particularly, to a processor-based structure and method for loading unaligned data.

2. Description of Related Art

Figure 1:
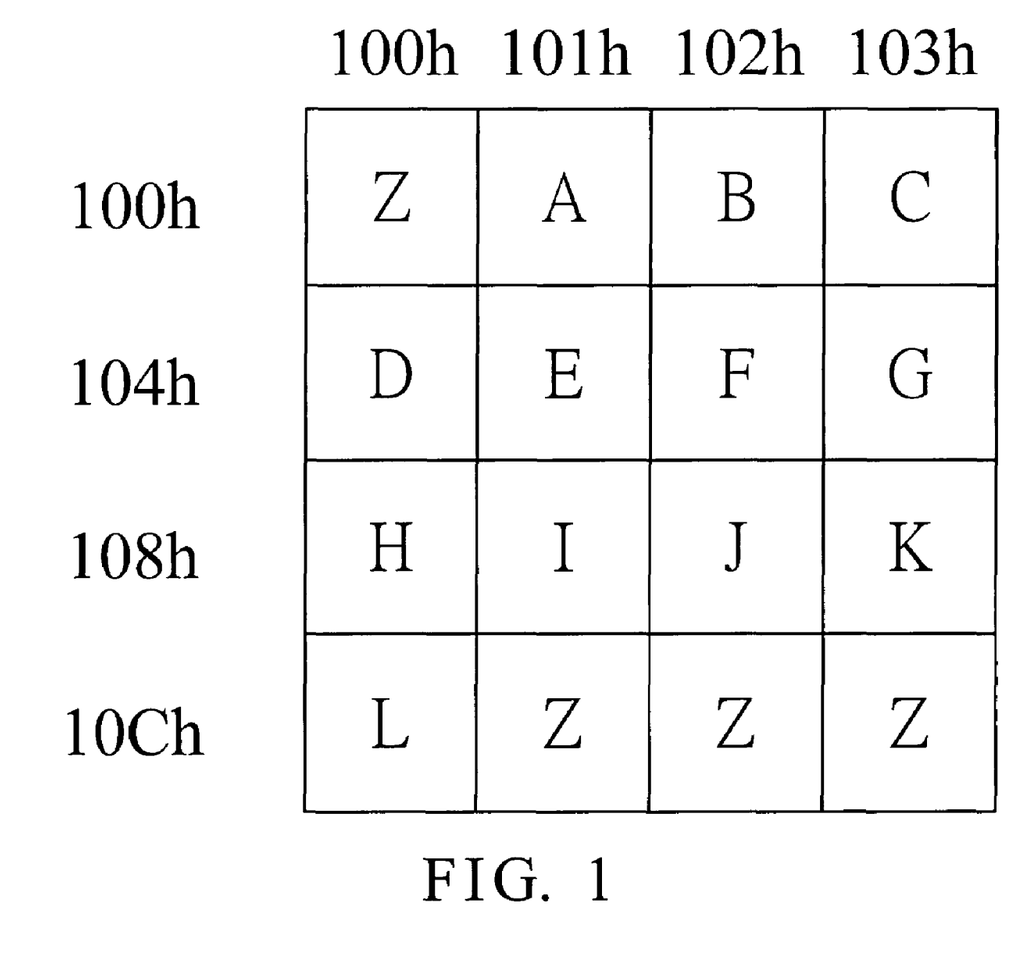
FIG. 1 shows a schematic view of typical memory arrangement of an unaligned data.

While a processor performs data processing, data alignment may affect the performances of many key operations, such as the operations of string, array and the like. As shown in FIG. 1, data to be processed, such as 'ABCDEFGHIJKL', normally exceeds the store boundary. As such, before a processor performs any string or array operation on the data, the data must be restored to the aligned format by executing many additional operations firstly.

Figure 2:
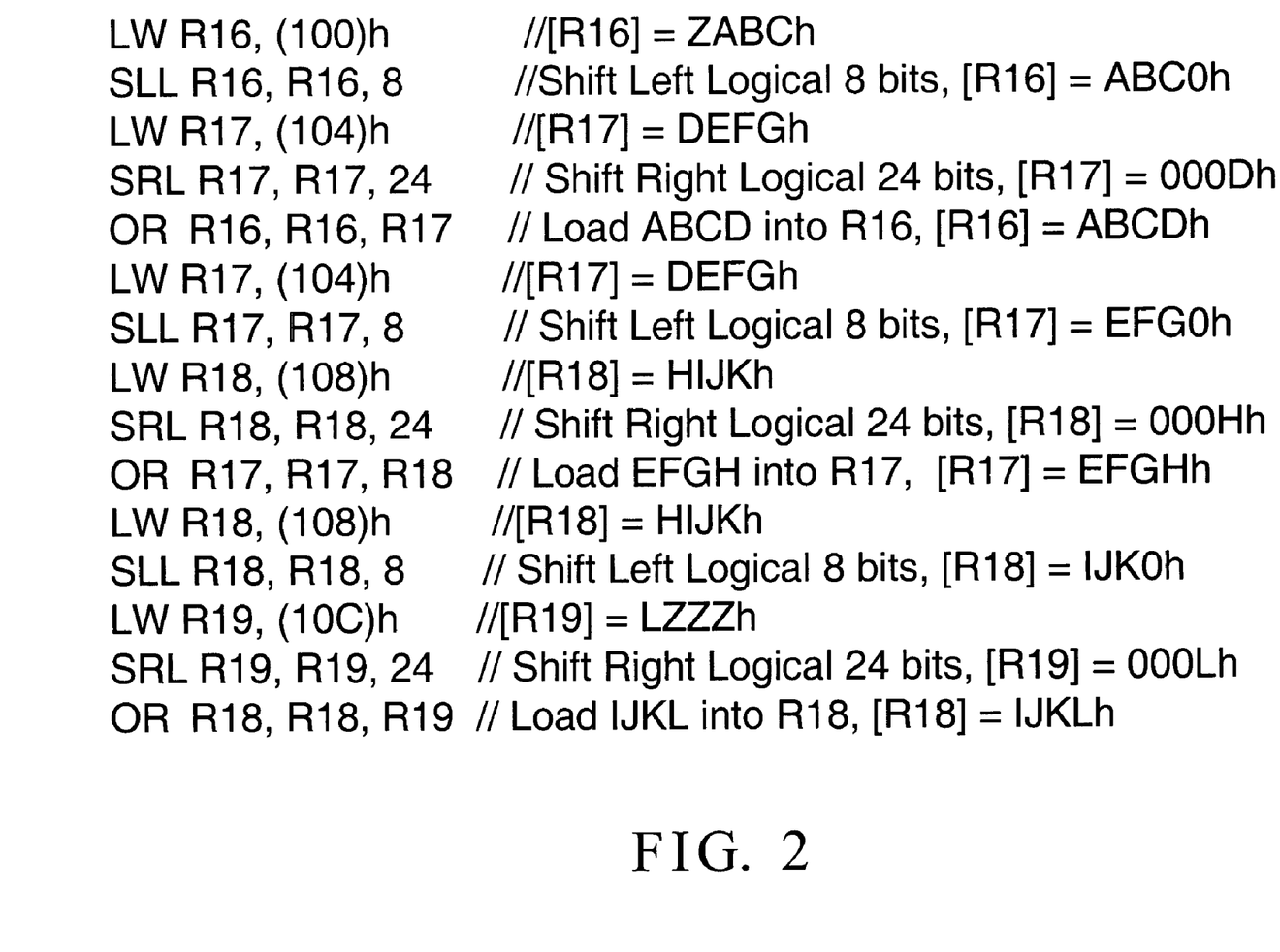
FIG. 2 shows a schematic view of program codes for loading an unaligned data in accordance with a prior art.

Upon this problem, a typical scheme is that after the data is loaded to the processor, various instructions in the processor are applied for obtaining required data. As shown in FIG. 2, partial data 'ZABC' at address 100$h$ is loaded to register R16 to shift left by eight bits and remove the letter 'Z', then partial data 'DEFG' at address 104$h$ is loaded to register R17 to shift right by 24 bits and remove letters 'EFG', and finally an OR operation is applied to registers R16 and R17 to obtain a result to be stored in register R16. At this point, the content of register R16 is a required data 'ABCD'. Accordingly, as the cited steps are repeated, partial data 'EFGH' and 'IJKL' are loaded to registers R17 and R18.

As cited, if a required length of unaligned data to be loaded is n words (each having 32 bits), the typical scheme requires 5n instructions to describe load operations and at least 5n instruction cycles to complete the load operations, which needs large memory space for storing required program codes and also increase processor load so as to cause poor performance.

Figure 3:
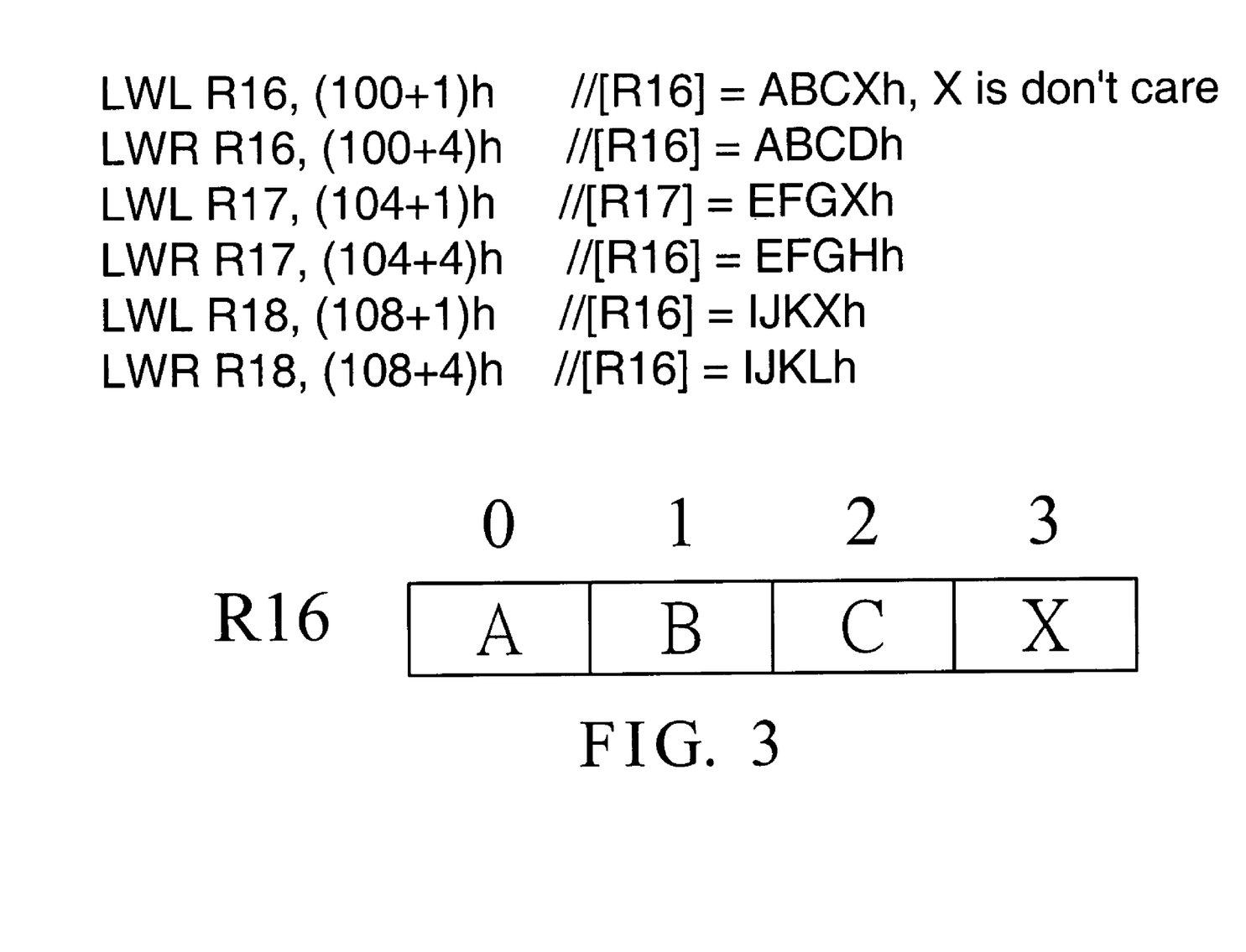
FIG. 3 shows a graph of program codes for loading an unaligned data to a register in accordance with another prior art.

Upon this problem, U.S. Pat. No. 4,814,976 granted to Hansen, et al. for a "RISC computer with unaligned reference handling and method for the same" performs the alignment as loading unaligned data and reads a data exceeding the boundary completely by two times. As shown in FIG. 3, data 'ABC' at addresses 101$h$ to 103$h$ is loaded to bytes 0, 1 and 2 of register r16. In this case, byte 3 of register 16 is X (don't care). Next, data 'D' at address 104$h$ is loaded to byte 3 of register R16. At this point, data 'ABCD' to be processed is in register R16. Accordingly, as the cited steps are repeated, data 'EFGH' and 'IJKL' are loaded to registers R17 and R18.

As cited, if a required length of unaligned data to be loaded is n words, it needs 2n instructions to describe load operation and at least 2n instruction cycles to complete the load operation. Since read and write are repeated at a same memory position and a same register, the processor pipeline stall can be increased and the bus bandwidth is wasted. Especially to some systems without cache, delay can be obvious.

Therefore, it is desirable to provide an improved structure and method for loading unaligned data to mitigate and/or obviate the aforementioned problems.

SUMMARY OF THE INVENTION

The object of the present invention is to provide a processor-based structure and method for loading unaligned data, which can avoid the prior problem and reduce required instructions for describing load operation and instruction cycles for completing load operation, thereby increasing the performance.

In accordance with one aspect of the present invention, there is provided a processor-based method for loading unaligned data. The unaligned data is stored in a memory having a plurality of m-bit words partitioned by word boundaries. The unaligned data is divided by word boundaries into a first part, a second part and a third part. The method includes: a first fetching step, a second fetching step, a first shifting step, a third fetching step, and a seconding shifting step. The first fetching step executes a first instruction to fetch a first word from the memory having the first part. The second fetching step executes a second instruction to fetch a second word from the memory having the second part. The first shifting step combines the first word and the second word to form a first combination and shifts the first combination to a first position. The third fetching step executes a third instruction to fetch a third word from the memory having the third part. The second shifting step combines the second word and the third word to form a second combination and shifts the second combination to the first position.

In accordance with another aspect of the present invention, there is provided a processor-based method for loading unaligned data. The unaligned data is stored in a memory having a plurality of m-bit words partitioned by word boundaries. The unaligned data is divided by word boundaries into a first part and a second part. The method includes: a start fetching step, an end fetching step and a first shifting step. The fetch start step executes a first instruction to fetch a first word from the memory having the first part. The fetch end step executes a second instruction to fetch a second word from the memory having the second part. The first shifting step combines the first word and the second word to form a first combination and shifts the first combination to a first position.

In accordance with a further feature of the present invention, there is provided a processor-based structure for loading unaligned data. The unaligned data divided by word boundaries into a first part, a second part and a third part is stored in a memory having a plurality of m-bit words partitioned by word boundaries. The structure includes: a load combine register, a shifter, and a controller. The internal register temporarily stores data. The load combine register is coupled to the memory for temporarily storing data read out of the memory. The shifter is coupled to the load combine register and the memory for shifting in accordance with stored address of the unaligned data. The controller firstly fetches a first word from the memory having the first part for storing in the load combine register temporarily, then fetches a second word from the memory having the second part such that the shifter combines the first word and the second word to form a first combination and shifts the first combination to a first position, and finally fetches a third word from the memory having the third part such that the shifter combines the second word and the third word to form a second combination and shifts the second combination to the first position.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
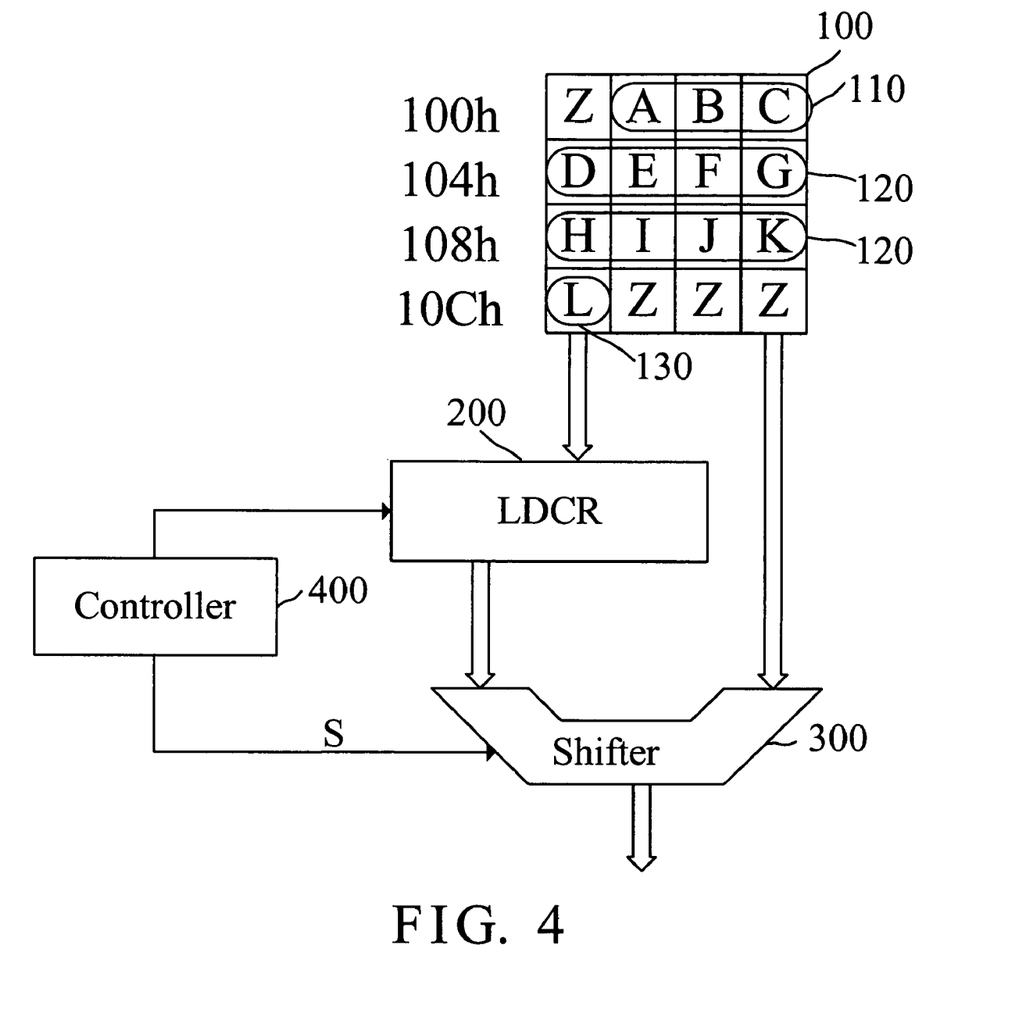
FIG. 4 is a block diagram of a processor-based structure for loading unaligned data in accordance with the invention.

FIG. 4 is a block diagram of a processor-based structure for loading unaligned data in accordance with the invention. As shown, the structure includes a memory 100, a load combine register (LDCR) 200, a shifter 300 and a controller 400. The memory 100 has a plurality of m-bit words partitioned by word boundaries. In this embodiment, m is preferred to be 32, i.e., the memory 100 consists of a plurality of 32-bit words. The unaligned data (ABCDEFGHIJKL) is stored in the memory 100 and divided by word boundaries into a first part 110, a second part 120 and a third part 130.

The LDCR 200 is coupled to the memory 100 for temporarily storing data read out of the memory 100. The shifter 300 is coupled to the LDCR 200 and the memory 100 for shifting in accordance with the stored address of the data. The shifting can be a form of shift or rotation.

The controller 400 firstly fetches a first word from the memory 100 having the first part 110 for storing in the LDCR 200 temporarily, then fetches a second word from the memory 100 having the second part 120 such that the shifter 300 combines the first word and the second word to form a first combination and shifts the first combination to a first position, and finally fetches a third word from the memory 100 having the third part 130 such that the shifter 300 combines the second word and the third word to form a second combination and shifts the second combination to the first position.

Figure 5:
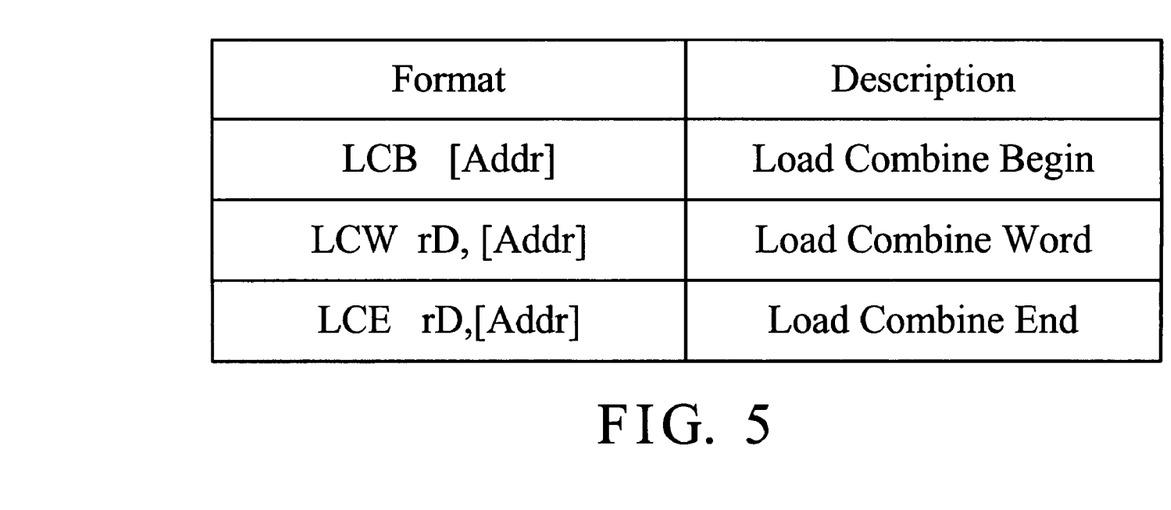
FIG. 5 is a table of instruction formats in accordance with the invention.

Three load instructions, Load Combine Begin (LCB), Load Combine Word (LCW) and Load Combine End (LCE), are defined by the inventive structure so that the controller 400 can generate corresponding control signals. Instruction formats are shown in FIG. 5.

Figure 6:
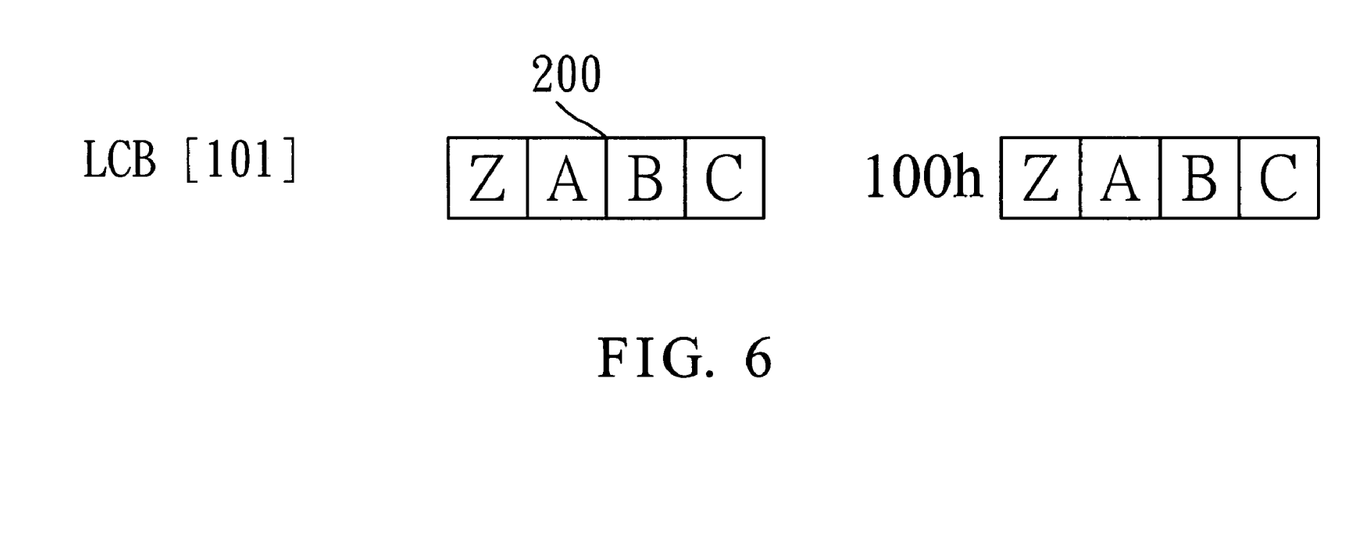
FIG. 6 schematically illustrates LCB instruction in accordance with the invention.

Instruction LCB [Addr] loads memory content at the stored address Addr to the LDCR 200. As shown in FIG. 6, LCB [101h] loads the content (ABC) of address 101h to the LDCR 200.

Figure 7:
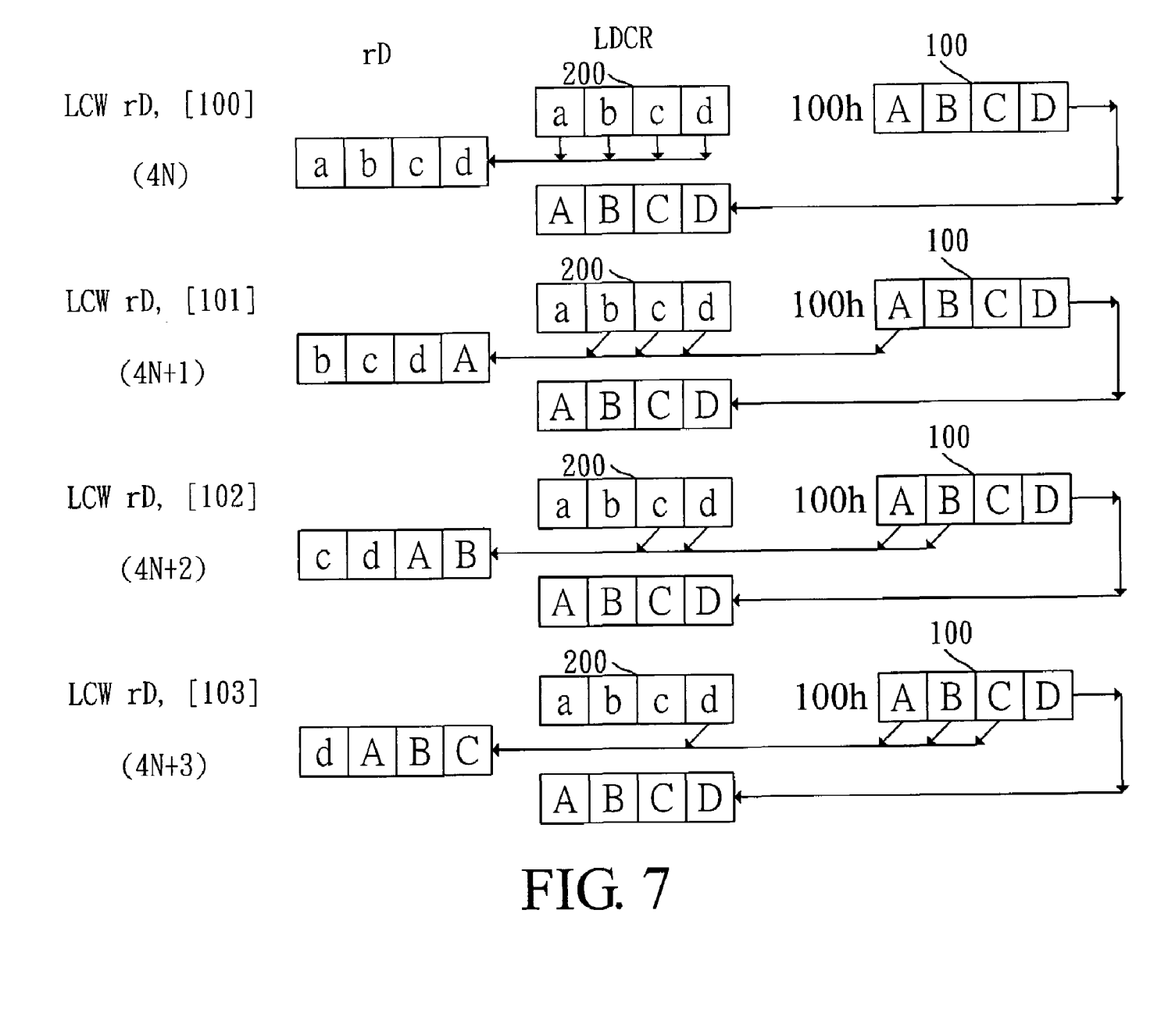
FIG. 7 schematically illustrates LCW instruction in accordance with the invention.

As shown in FIG. 7, instruction LCW rD, [Addr] firstly combines memory content at the stored address Addr and the content of the LDCR 200, then shifts the combined content left in accordance with the address Addr, and finally writes the shifted content to register rD. At this point, the memory content at the address Addr is loaded to the LDCR 200, wherein when Addr=4N (positive integer), no shift is performed; when Addr=4N+1, shifting left by eight bits is performed; when Addr=4N+2, shifting left by 16 bits is performed; and when Addr=4N+3, shifting left by 24 bits is performed.

Figure 8:
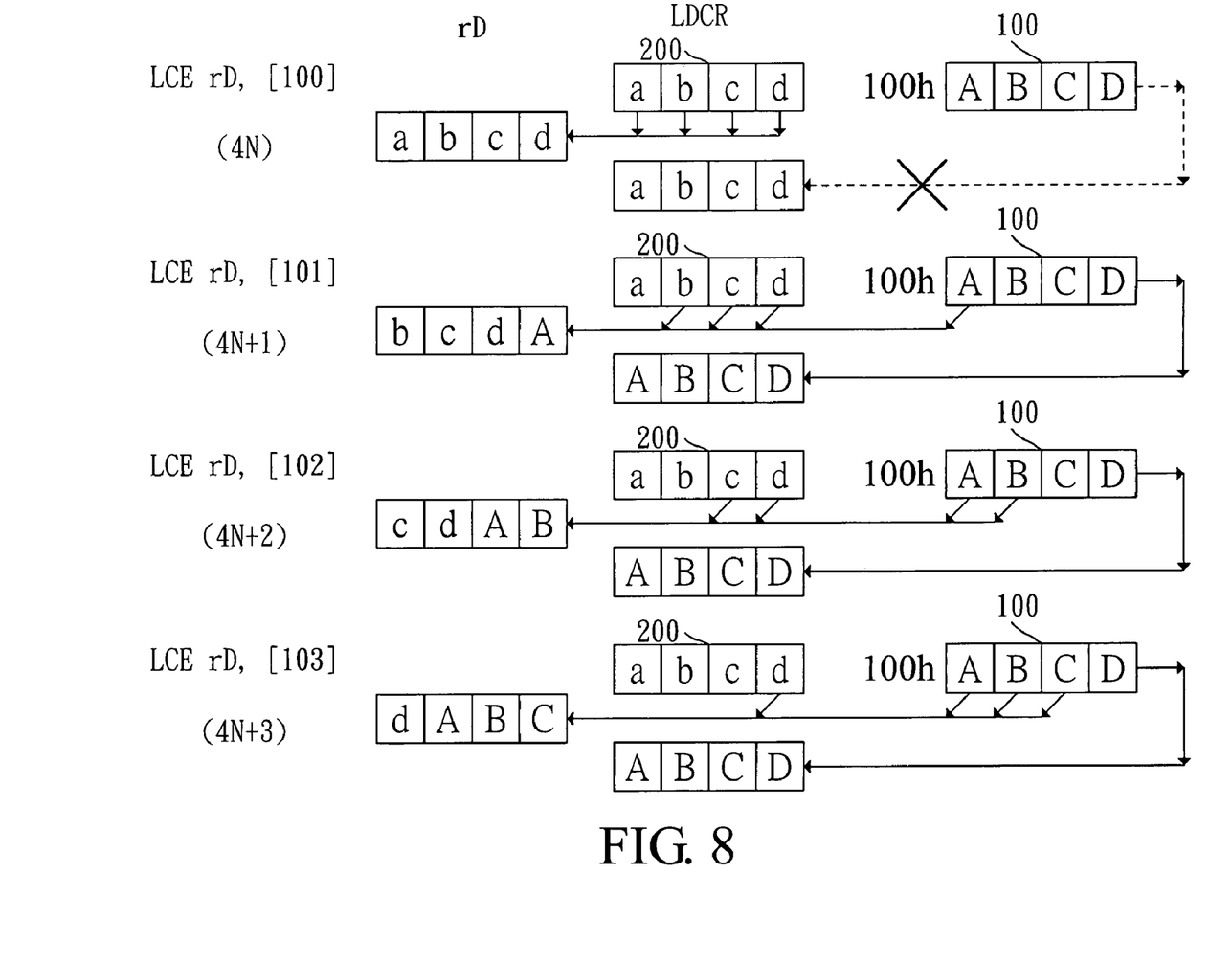
FIG. 8 schematically illustrates LCE instruction in accordance with the invention.

As shown in FIG. 8, for instruction LCE rD, [Addr], when Addr=4N, the content of the LDCR 200 is written into register rD directly but memory content at the stored address Addr is not loaded into the LDCR 200. When Addr is not equal to 4N, the memory content at the stored address Addr and the content of the LDCR 200 are combined to further write to the register rD after shifting left in accordance with the address Addr. At this point, the memory content at the address Addr is loaded to the LDCR 200, wherein when Addr=4N+1 (N is positive integer), shifting left by eight bits is performed; when Addr=4N+2, shifting left by 16 bits is performed; and when Addr=4N+3, shifting left by 24 bits is performed.

Figure 9:
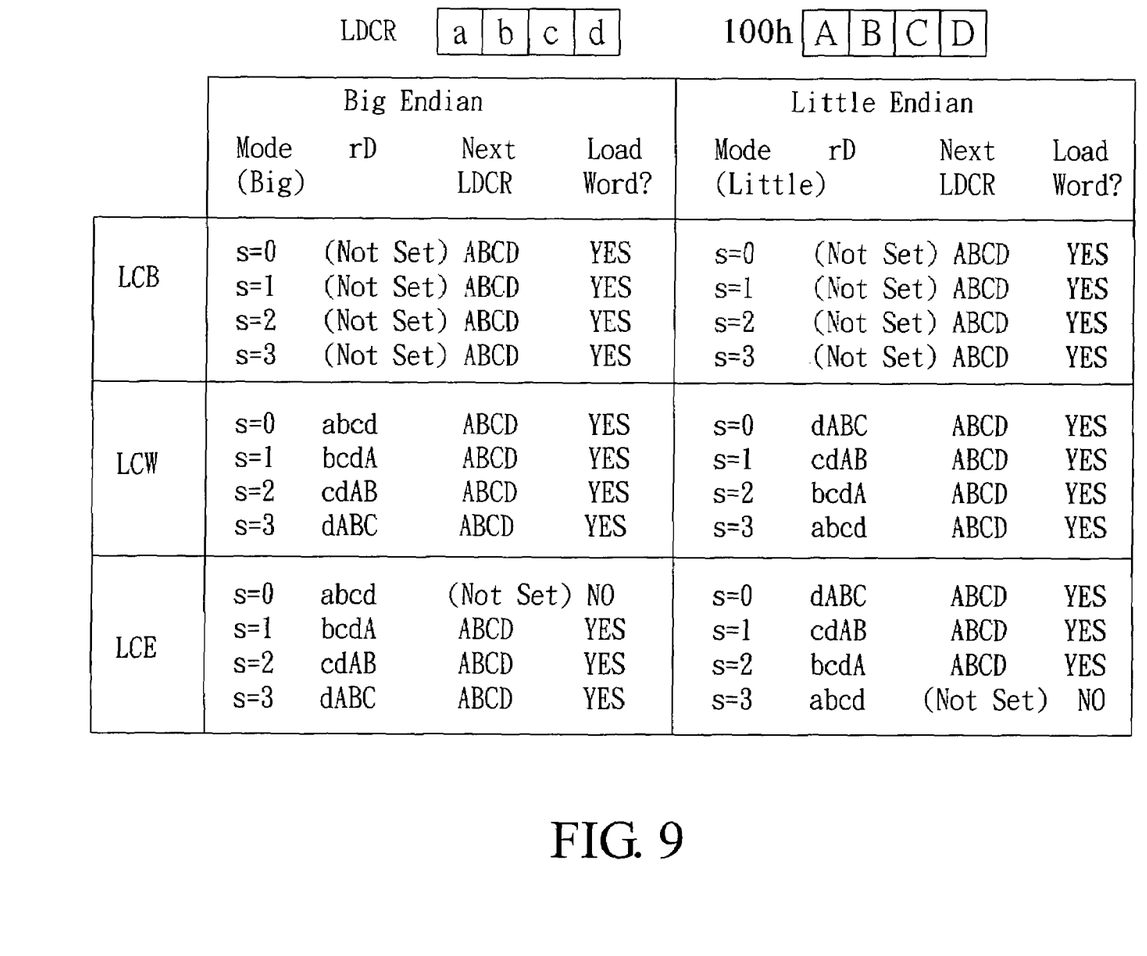
FIG. 9 is a table of executing LCB, LCW and LCE instructions in accordance with the invention.

FIG. 9 shows a summary table of executing the instructions LCB [Addr], LCW rD, [Addr] and LCE rD, [Addr] under data arrangement of little endian and big endian. As shown in FIG. 9, for data 'abcd' in the LDCR 200 and data 'ABCD' in the memory, s=0 represents Addr=4N, s=1 represents Addr=4N+1, s=2 represents Addr=4N+2, and s=3 represents Addr=4N+3. In this case, 4N=100 is given as an example.

Figure 10:
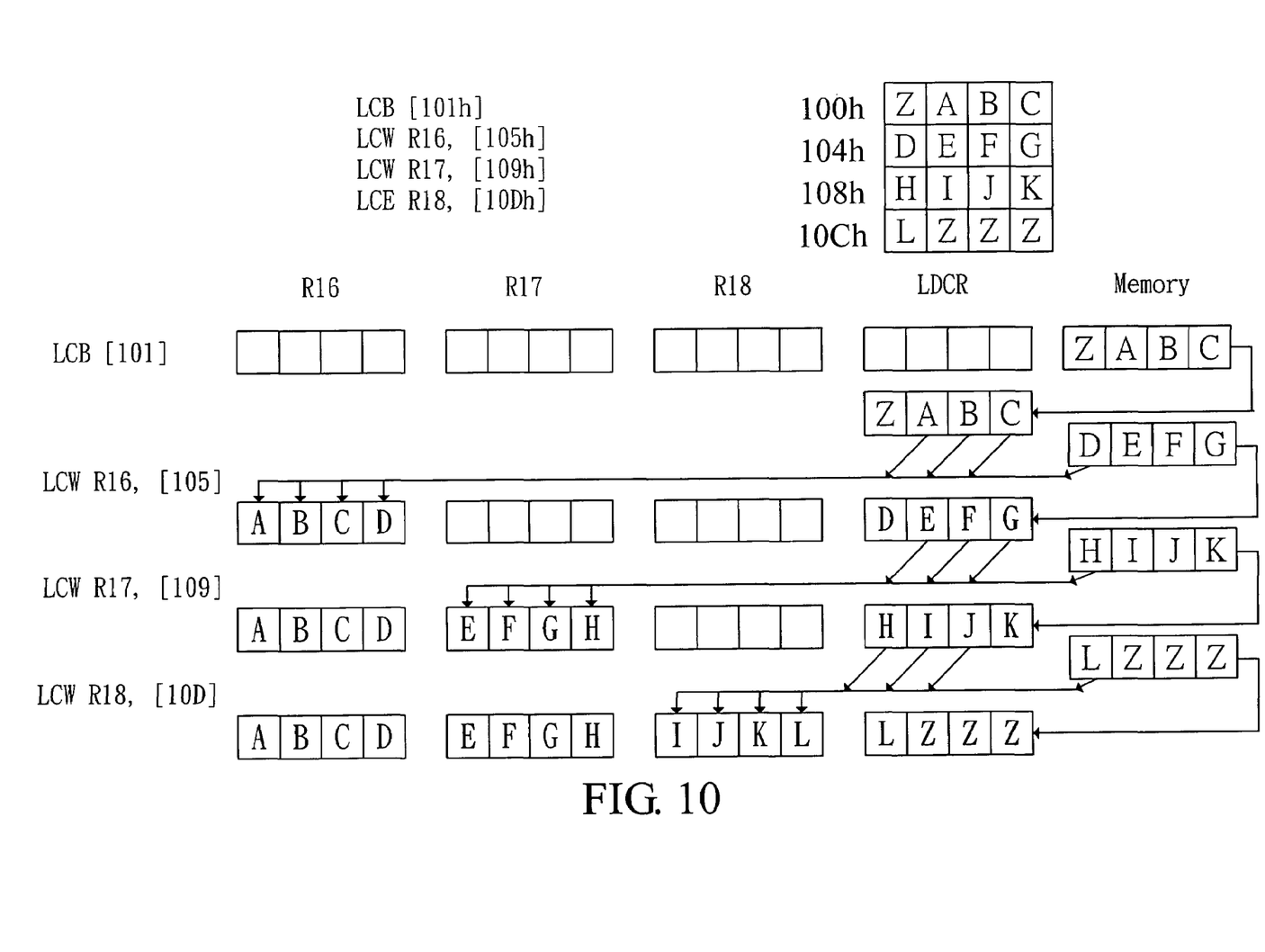
FIG. 10 shows an example of the invention.

FIG. 10 is an example of the invention. As shown, when an unaligned data 'ABCDEFGHIJKL' is to load to registers R16, R17 and R18, an instruction LCB [101h] is executed firstly to load content 'ZABC' at the stored address 101h in the memory 100 to the LDCR 200. The LDCR 200 has a content 'ZABC' ([LDCR]=ZABC) after the instruction LCB [101h] is executed completely. Next, an instruction LCW R16, [105h] is executed to combine the content 'ZABC' of the LDCR 200 and a content 'DEFG' of the memory containing the address 105h to obtain 'ZABCDEFG'. Next, the content 'ZABCDEFG' is shifted left by eight bits in accordance with the address 105h in order to write the content 'ABCD' of high 32 bits of the shifted content to register R16. Also, memory content containing the address 105h is loaded to the LDCR 200 such that after the instruction LCW R16, [105h] is executed completely, the register R16 has a content 'ABCD' and the LDCR 200 has a content 'DEFG' ([LDCR]=DEFG).

Next, an LCW R17, [109h] is executed to combine the content 'DEFG' of the address 105h and a content 'HIJK' of the memory containing the address 109h to obtain 'DEFGHIJK'. Next, the content 'DEFGHIJK' is shifted left by eight bits in accordance with the address 109h in order to write the content 'EFGH' of high 32 bits of the shifted content to register R17. Also, memory content containing the address 109h is loaded to the LDCR 200 such that after the instruction LCW R17, [109h] is executed completely, the register R17 has a content 'EFGH' and the LDCR 200 has a content 'HIJK' ([LDCR]=HIJK).

Finally, an instruction LCE R18, [10Dh] is executed to combine the content 'HIJK' of the LDCR 200 and a content 'LZZZ' of the memory containing the address 10Dh to obtain 'HIJKLZZZ'. Next, the content 'HIJKLZZZ' is shifted left by eight bits in accordance with the address 10Dh in order to write the content 'IJKL' of high 32 bits of the shifted content to register R18. Also, memory content containing the address 10Dh is loaded to the LDCR 200 such that after the instruction LCE R18, [10Dh] is executed completely, the register R18 has a content 'IJKL' and the 'LDCR' 200 has a content 'LZZZ' ([LDCR]=LZZZ).

Figure 11:
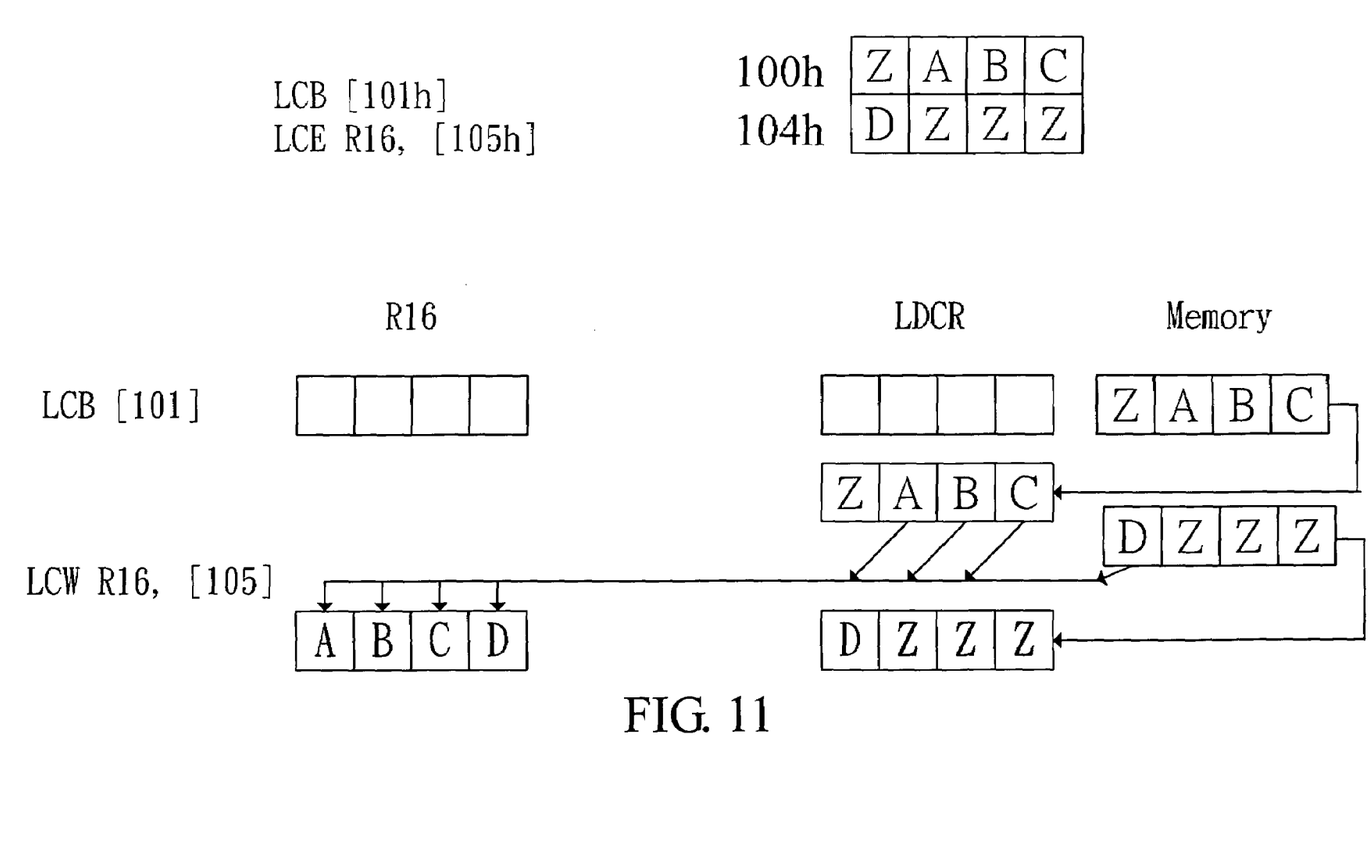
FIG. 11 shows another example of the invention.

FIG. 11 is another example of the invention. As shown, when an unaligned data 'ABCD' is to load to registers R16, an instruction LCB [101h] is executed firstly to load content 'ZABC' at stored address 101h in the memory 100 to the LDCR 200. The LDCR 200 has a content ZABC ([LDCR]= ZABC) after the instruction LCB [101 h] is executed completely.

Next, an instruction LCE R16, [105h] is executed to combine the content 'ZABC' of the LDCR 200 and a content 'D' of the memory containing the address 105h to obtain 'ZABCDZZZ'. Next, the content 'ZABCDZZZ' is shifted left by eight bits in accordance with the address 105h in order to load the content 'ABCD' of high 32 bits of the shifted content to the register R16. Also, memory content containing the address 105h is loaded to the LDCR 200 such that after the instruction LCE R16, [105h] is executed completely, the register R16 has a content 'ABCD' and the LDCR 200 has a content 'DZZZ' ([LDCR]=DZZZ).

In view of the foregoing, it is known that, if a required length of unaligned data to be loaded is n words, the invention can describe load operations only by (n+1) instructions, which requires only (n+1) instruction cycles to complete the load operations, thereby reducing codes and relatively increasing performance. In addition, repeated read/write does not occur on a same memory or register position, and thus the stall probability of a processor pipeline is reduced. Further, a same memory position is loaded only one time at a pinch, and thus bus bandwidth is saved to reach the best utilization.

Although the present invention has been explained in relation to its preferred embodiment, it is to be understood that many other possible modifications and variations can be made without departing from the spirit and scope of the invention as hereinafter claimed.

What is claimed is:

1. A processor-based method for loading unaligned data, wherein the unaligned data is divided by word boundaries into a first part, a second part and a third part, and stored in a memory having a plurality of m (positive integer)-bit words partitioned by word boundaries, the method comprising:
a first fetching step, which executes a first instruction to fetch a first word from the memory having the first part;
a second fetching step, which executes a second instruction to fetch a second word from the memory having the second part;
a first shifting step, which combines the first word and the second word to form a first combination and shifts the first combination to a first position;
a third fetching step, which executes a third instruction to fetch a third word from the memory having the third part; and
a second shifting step, which combines the second word and the third word to form a second combination and shifts the second combination to the first position.

2. The method as claimed in claim 1, further comprising:
a repeat fetching step, which replaces the second word with the first word and executes a second instruction to fetch a second word from the memory having the second part; and
a third shifting step, which combines the first word and the second word to form a third combination and shifts the third combination to the first position.

3. The method as claimed in claim 1, wherein the shifting steps perform shift.

4. The method as claimed in claim 1, wherein the shifting steps perform rotation.

5. The method as claimed in claim 1, wherein the first part and the third part have a size less than m bits respectively.

6. The method as claimed in claim 1, wherein the first part has a size equal to m bits.

7. The method as claimed in claim 2, wherein m is 32.

8. The method as claimed in claim 2, wherein the first, the second and the third shifting steps performs shifting left by eight bits respectively.

9. The method as claimed in claim 2, wherein the first, the second and the third shifting steps performs shifting left by 16 bits respectively.

10. The method as claimed in claim 2, wherein the first, the second and the third shifting steps performs shifting left by 24 bits respectively.

11. A processor-based method for loading unaligned data, wherein the unaligned data is stored in a memory having a plurality of m (positive integer)-bit words partitioned by word boundaries, and divided by word boundaries into a first part and a second part, the method comprising:
a start fetching step, which executes a first instruction to fetch a first word from the memory having the first part;
an end fetching step, which executes a second instruction to fetch a second word from the memory having the second part; and
a first shifting step, which combines the first word and the second word to form a first combination and shifts the first combination to a first position.

12. The method as claimed in claim 11, wherein the first shifting step performs shift.

13. The method as claimed in claim 11, wherein the first shifting step performs rotation.

14. The method as claimed in claim 11, wherein the first part and the second part have a size less than m bits respectively.

15. The method as claimed in claim 11, wherein the first part has a size equal to m bits.

16. The method as claimed in claim 11, wherein m is 32.

17. The method as claimed in claim 16, wherein the first shifting step performs shifting left by eight bits.

18. The method as claimed in claim 16, wherein the first shifting step performs shifting left by 16 bits.

19. The method as claimed in claim 16, wherein the first shifting step performs shifting left by 24 bits.

20. A processor-based device for loading unaligned data, wherein the unaligned data is divided by word boundaries into a first part, a second part and a third part, and stored in a memory having a plurality of m (positive integer)-bit words partitioned by word boundaries, the device comprising:
a load combine register, which is coupled to the memory for temporarily storing data read out of the memory;
a shifter, which is coupled to the load combine register and the memory for shifting in accordance with stored address of the unaligned data; and
a controller, which firstly fetches a first word from the memory having the first part for storing in the load combine register temporarily, then fetches a second word from the memory having the second part such that the shifter combines the first word and the second word to form a first combination and shifts the first combination to a first position, and finally fetches a third word from the memory having the third part such that the shifter combines the second word and the third word to form a second combination and shifts the second combination to the first position.

21. The device as claimed in claim 20, wherein the shifter applies shift to the load combine register and the memory.

22. The device as claimed in claim 20, wherein the shifter applies rotation to the load combine register and the memory.

23. The device as claimed in claim 20, wherein the first part and the third part have a size less than m bits respectively.

24. The device as claimed in claim 20, wherein the first part has a size equal to m bits.

25. The device as claimed in claim 20, wherein m is 32.

26. The device as claimed in claim 20, wherein the shifter performs shifting left by eight bits.

27. The device as claimed in claim 20, wherein the shifter performs shifting left by 16 bits.

28. The device as claimed in claim 20, wherein the shifter performs shifting left by 24 bits.

* * * * *